United States Patent
Chen (10) Patent No.: US 12,016,099 B1
(45) Date of Patent: Jun. 18, 2024

(54) METHOD FOR CONTROLLING INTELLIGENT ADJUSTMENT OF BRIGHTNESS, COLOR AND COLOR TEMPERATURE OF LAMPS

(71) Applicant: Shijia Chen, Xiamen (CN)

(72) Inventor: Shijia Chen, Xiamen (CN)

(73) Assignee: Shijia Chen, Xiamen (CN)

( * ) Notice: Subject to any disclaimer, the term of this patent is extended or adjusted under 35 U.S.C. 154(b) by 0 days.

(21) Appl. No.: 18/452,474

(22) Filed: Aug. 18, 2023

(30) Foreign Application Priority Data

Jul. 24, 2023 (CN) .......................... 202310907438.7

(51) Int. Cl.
*H05B 45/10* (2020.01)
*H05B 45/20* (2020.01)
*H05B 45/325* (2020.01)
*H05B 47/17* (2020.01)

(52) U.S. Cl.
CPC ............ *H05B 47/17* (2020.01); *H05B 45/10* (2020.01); *H05B 45/20* (2020.01); *H05B 45/325* (2020.01)

(58) Field of Classification Search
CPC ...... H05B 45/10; H05B 45/20; H05B 45/325; H05B 47/17; H03K 7/08; H03K 9/08; Y02B 20/40
See application file for complete search history.

(56) References Cited

U.S. PATENT DOCUMENTS

| | | | | |
|---|---|---|---|---|
| 9,057,491 | B2 * | 6/2015 | Lee | ............................ F21S 2/00 |
| 10,314,124 | B1 * | 6/2019 | Yang | ...................... H05B 47/20 |
| 2009/0303209 | A1 * | 12/2009 | Teng | ........................ G09G 3/20 |
| | | | | 345/204 |
| 2019/0230760 | A1 * | 7/2019 | Li | .......................... H05B 47/19 |

FOREIGN PATENT DOCUMENTS

| | | |
|---|---|---|
| CN | 103338564 A | 10/2013 |
| CN | 207039947 U | 2/2018 |
| CN | 108811282 A | 11/2018 |

* cited by examiner

*Primary Examiner* — Haissa Philogene
(74) *Attorney, Agent, or Firm* — Nitin Kaushik (57) ABSTRACT

The present invention relates to the technical field of smart lighting, in particular to a method for controlling intelligent adjustment of brightness, color and color temperature of lamps. The method periodically stores the total running time of a lamp from the current power-on to the present at each power-on stage by switching on and off; and matches the running time data of the device powered on in different periods with the predetermined logic of dimming, color tuning, or color temperature tuning. Once there is a successful matching, the device enters a mode of automatically cycling dimming, color turning or color temperature tuning. Users may select their favorite brightness, color or color temperature by powering off when lamps automatically switch to the brightness, color or color temperature.

6 Claims, 8 Drawing Sheets

METHOD FOR CONTROLLING INTELLIGENT ADJUSTMENT OF BRIGHTNESS, COLOR AND COLOR TEMPERATURE OF LAMPS

CROSS-REFERENCE TO RELATED APPLICATIONS

The application claims priority to Chinese patent application No. 2023109074387, filed on Jul. 24, 2023, the entire contents of which are incorporated herein by reference.

TECHNICAL FIELD

The present invention relates to the technical field of smart lighting, in particular to a method for controlling intelligent adjustment of brightness, color and color temperature of lamps.

BACKGROUND

Currently lamps on the market, such as bulb lamps and ceiling lamps, need to use infrared remote control, buttons, dimmers, and hardware circuits to identify the exact time of power on/off, and use wireless ZIGBEE, BLE, wiring PLC or other methods to adjust brightness, color and color temperature of lamps, thereby achieving the desired effects. These methods are generally not ideal in terms of user experience, with problems of low error tolerance, high cost, single control, cumbersome installation, non-automatic or delicate adjustment of brightness, color, and color temperature, and requiring multiple controls to select the desired brightness, color and color temperature according to ambient conditions.

SUMMARY

The object of the present invention is to provide a method for controlling intelligent adjustment of brightness, color and color temperature of lamps, solving the problems of control devices in the existing dimmable, color- and color temperature-tunable lamps, such as low error tolerance, high cost, single control, cumbersome installation, non-automatic or delicate adjustment of brightness, color, and color temperature, and requiring multiple controls to select the desired brightness, color and color temperature according to ambient conditions.

In order to solve the above-mentioned technical problems, the present invention provides a method for controlling intelligent adjustment of brightness, color and color temperature of lamps, comprising storing once the running time information of a device from the current power-on to the present in a storage module at a predetermined time interval; self-checking whether the information and predetermined number of the running time of the device powered on in different periods in the storage module are consistent with the logic of dimming, color tuning or color temperature tuning, wherein the device enters a mode of automatically cycling PWM dimming when it is consistent with the dimming logic, a mode of automatically cycling PWM color tuning when it is consistent with the color tuning logic, or a mode of automatically cycling PWM color temperature tuning when it is consistent with the color temperature tuning logic; storing the changed PWM values in real time until the device is powered off and then powered on to exit the mode of cycling dimming, color tuning or color temperature tuning; and locking the PWM values as the last PWM values stored before power-off.

Further, said step of storing once the running time of a device from the current power-on to the present in a storage module at a predetermined time interval comprises: starting a timer after the device is powered on; and storing once the current timer value, i.e., the running time, periodically at a predetermined time interval to the storage module, wherein the final running time of the device at this power-on is equal to the last running time stored during this power-on.

Further, said step of self-checking whether the information and predetermined number of the running time of the device powered on in different periods in the storage module are consistent with the logic of dimming, color tuning or color temperature tuning comprises acquiring the running time information and predetermined number of the device powered on in different periods in the storage module, and matching the information with the logic of dimming, color tuning or color temperature tuning, wherein the device enters the corresponding mode if there is a successful match.

Further, said step of entering a mode of automatically cycling PWM dimming when the information and predetermined number of the running time of the device powered on in different periods are consistent with the dimming logic comprises the device entering a mode of automatically cycling PWM dimming in a predetermined range of brightness, in which the device will be PWM dimmed in a cycle of from low brightness to high brightness and then from high to low; at this time, simultaneously storing PWM values in real time to the storage module until the device is powered off and then powered on to exit the mode of cycling dimming; and locking the PWM values as the last PWM values stored before the last power-off.

Further, said step of entering a mode of automatically cycling PWM color tuning when the information and predetermined number of the running time of the device powered on in different periods are consistent with the color tuning logic comprises the device entering a mode of automatically cycling PWM color tuning in three channels involving a predetermined range of the RGB three-channel PWM duty cycle change and a predetermined PWM offset time in RGB three channels, in which the RGB three-channel PWM duty cycle is cycled from low to high and then from high to low, and there are time offsets when the PWM starts to cycle in RGB three channels; at this time, simultaneously storing PWM values in real time to the storage module until the device is powered off and then powered on to exit the mode of cycling color tuning; and locking the PWM values as the last PWM values stored before the last power-off.

Further, said step of entering a mode of automatically cycling PWM color temperature tuning when the information and predetermined number of the running time of the device powered in different periods are consistent with the logic of color temperature tuning comprises the device entering a mode of automatically cycling PWM color temperature tuning in a predetermined range of color temperature, in which the color temperature of the device will be PWM adjusted in a cycle of from low to high and then from high to low; at this time, simultaneously storing PWM values in real time to the storage module until the device is powered off and then powered on to exit the mode of cycling color temperature tuning; and locking the PWM values as the last PWM values stored before the last power-off.

By adopting the above-mentioned technical solutions, the present invention has following beneficial effects:

The method for controlling intelligent adjustment of brightness, color and color temperature provided herein performs means of cycling PWM dimming in a predetermined range of brightness, cycling color tuning involving a predetermined range of the RGB three-channel PWM duty cycle change and a predetermined PWM offset time in RGB three channels, and cycling PWM color temperature tuning in a predetermined range of color temperature. Users may select their favorite brightness, color or color temperature by powering off when lamps automatically switch to the brightness, color or color temperature, different from other means of adjusting brightness, color, and color temperature which need to manually select the brightness, color, and color temperature values to be displayed through a third-party device for control, which generally do not have ideal effects in the pre-adjusted brightness, color, or color temperature in the actual conditions, and which requires multiple switches for adjustment. This proposal not only simplifies complex adjustments of brightness, color, and color temperature, but also meets users' needs for delicate lighting, offering better user experience.

The method for controlling intelligent adjustment of brightness, color and color temperature provided herein periodically stores the total running time of the device from the current power-on to the present by switching on and off, records several times the final running time of the device powered on in different periods, and matches with the logic of dimming, color and color temperature, which achieves the functions of tuning brightness, color and color temperature on the basis of obtaining the accurate power-off time support without relying on a third-party control device or hardware circuit, i.e., simplifying installation and lowering costs.

The method for controlling intelligent adjustment of brightness, color and color temperature provided herein periodically stores the total running time of the device from the current power-on to the present by switching on and off, records several times the final running time of the device powered on in different periods, and matches several times the data of the running time of the device powered on in different periods with the logic of dimming, color tuning or color temperature tuning. This method is flexible in detection, has diverse functions, tunes brightness, color or color temperature by flexible recognition, greatly improves the error tolerance, and is also applied to parallel and combined recognition of various functions.

BRIEF DESCRIPTION OF DRAWINGS

To illustrate the technical solutions in the specific embodiments of the present invention or in the prior art more clearly, the accompanying drawings required for describing the specific embodiments or the prior art are briefly described below. Apparently, the accompanying drawings in the following descriptions show merely some embodiments of the present invention, and a person of ordinary skill in the art may still derive other drawings from these accompanying drawings without inventive efforts.

FIG. 3 is a valid timing graph showing power-on/off of the device in different periods and the total running time of the device at this power-on periodically stored every time the device is powered on.

FIG. 4 is an invalid timing graph showing power-on/off of the device in different periods and the total running time of the device at this power-on periodically stored every time the device is powered on.

DETAILED DESCRIPTION OF THE EMBODIMENTS

The technical solutions of the present invention are clearly and completely described below with reference to the accompanying drawings. Apparently, the described embodiments are a part rather than all of the embodiments of the present invention. All other embodiments obtained by a person of ordinary skill in the art based on the embodiments of the present invention without inventive efforts shall fall within the protection scope of the present invention.

The present invention is further explained below with reference to specific embodiments.

Figure 1:
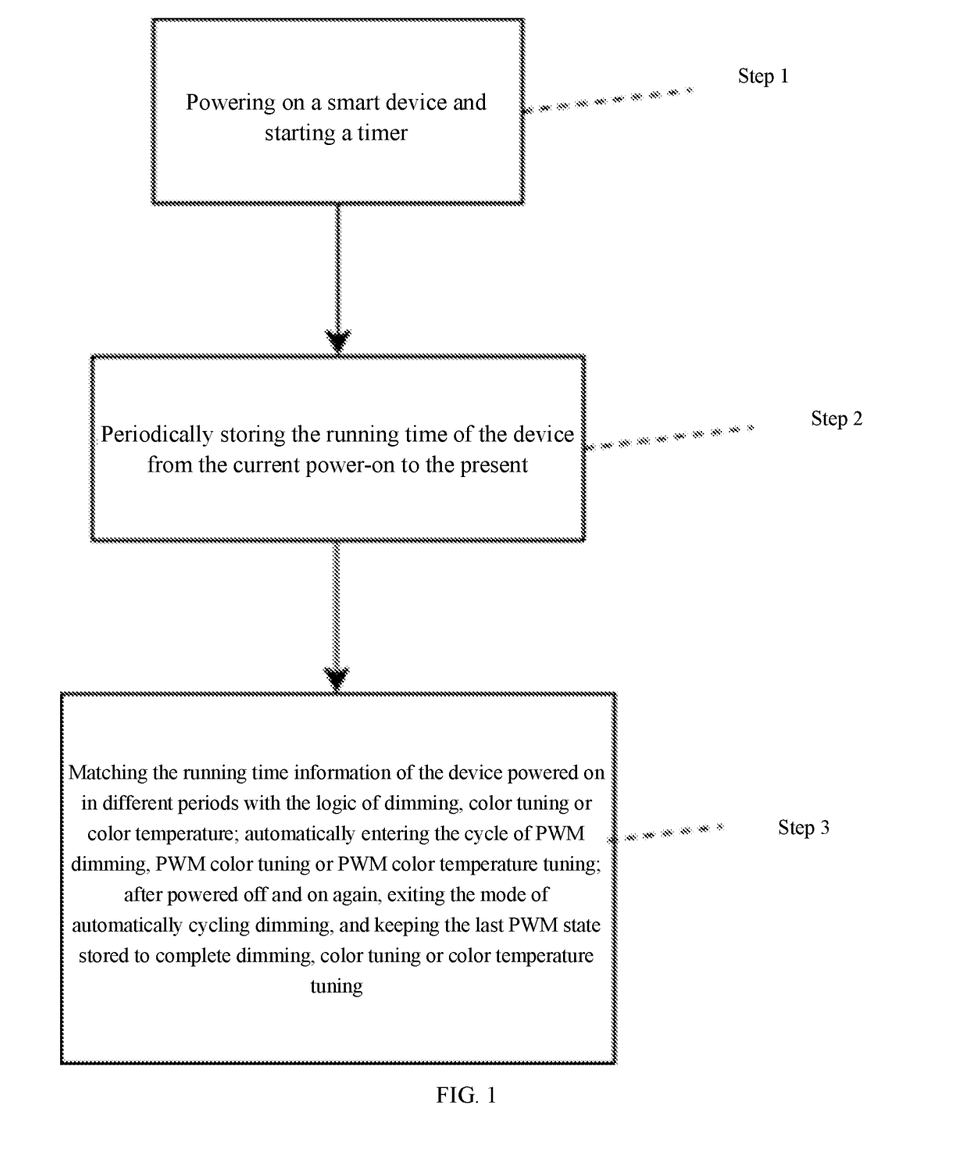
FIG. 1 is a flowchart illustrating a method for controlling intelligent adjustment of brightness, color and color temperature of lamps.
Figure 2A:
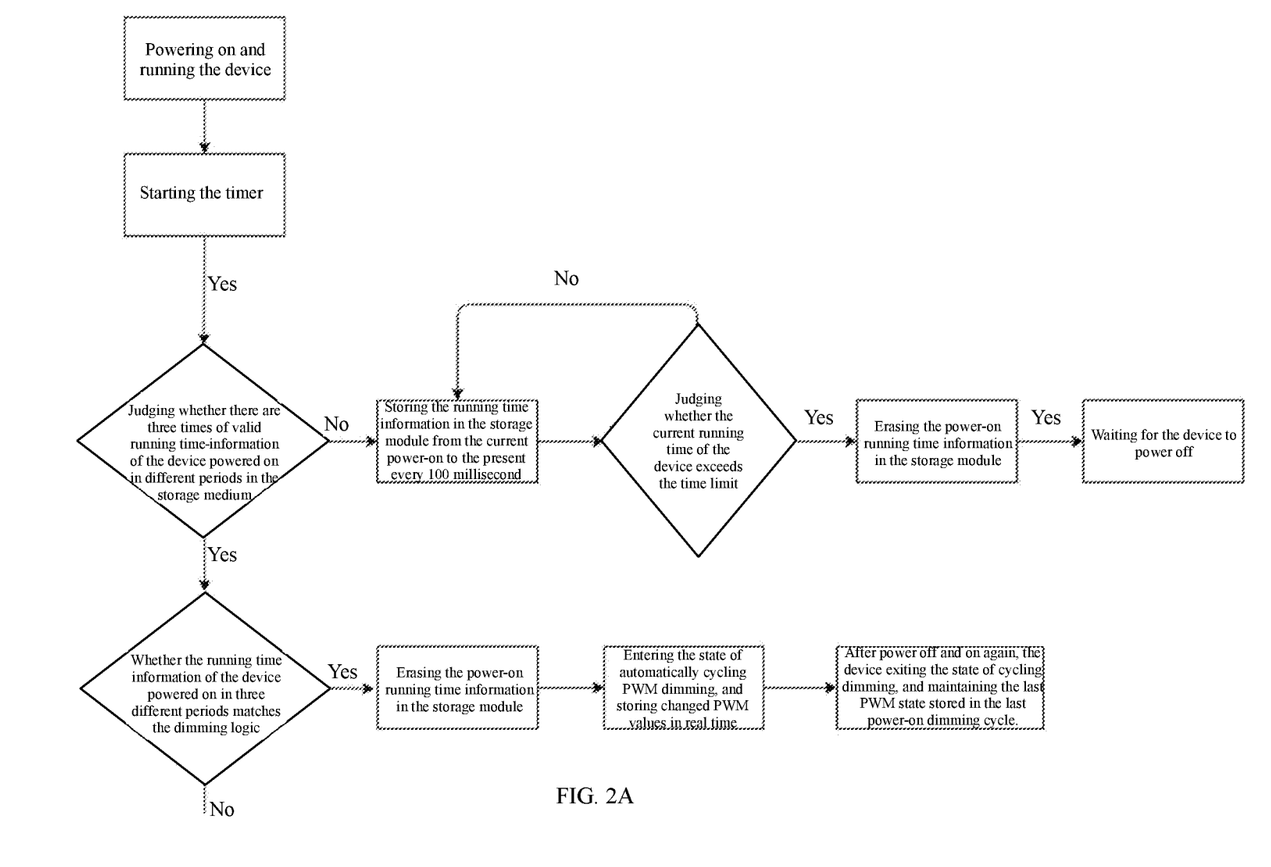
FIG. 2A and FIG. 2B are an overall flowchart illustrating a method for controlling intelligent adjustment of brightness, color and color temperature of lamps.
Figure 2B:
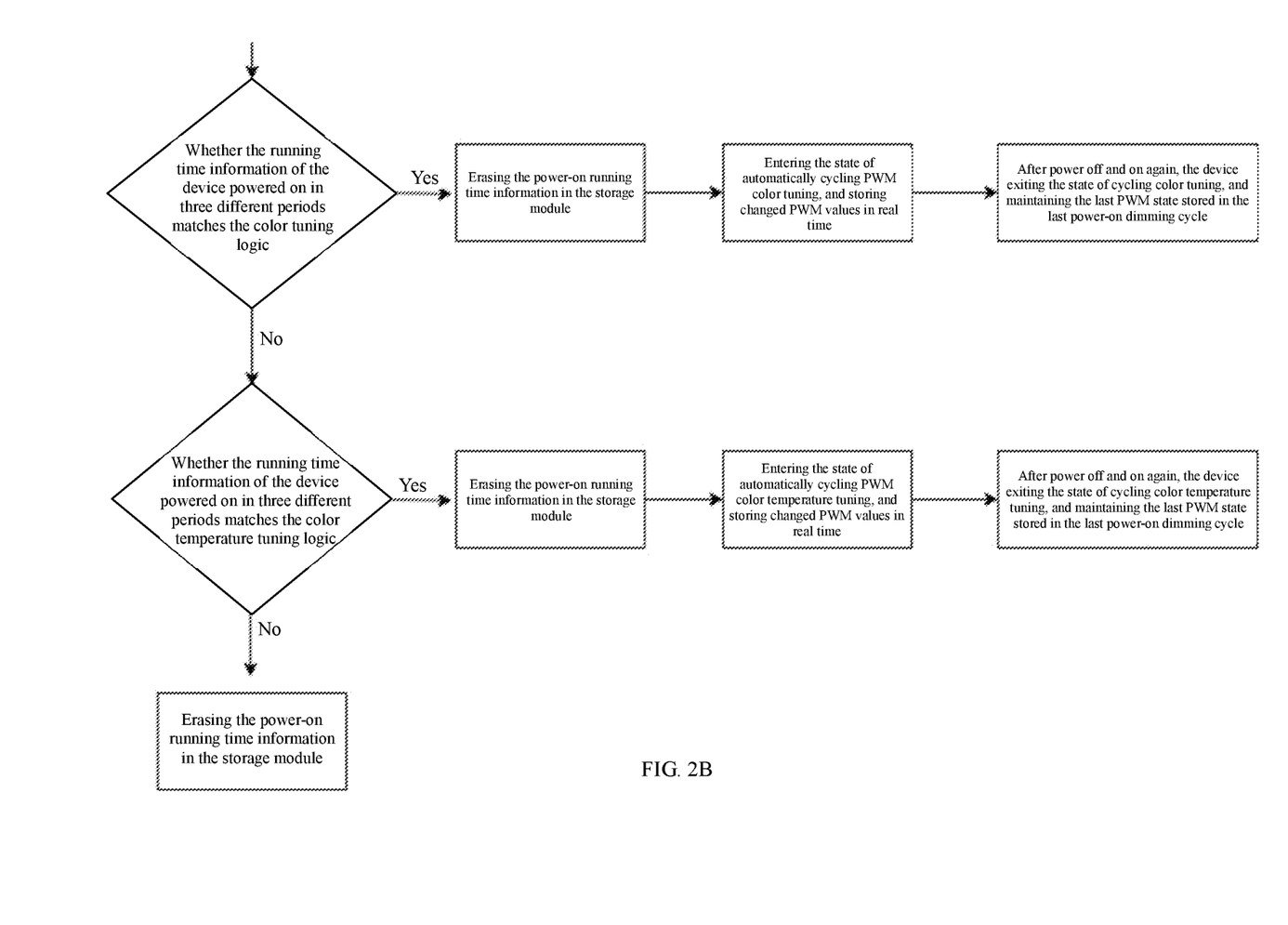
Figure 3:
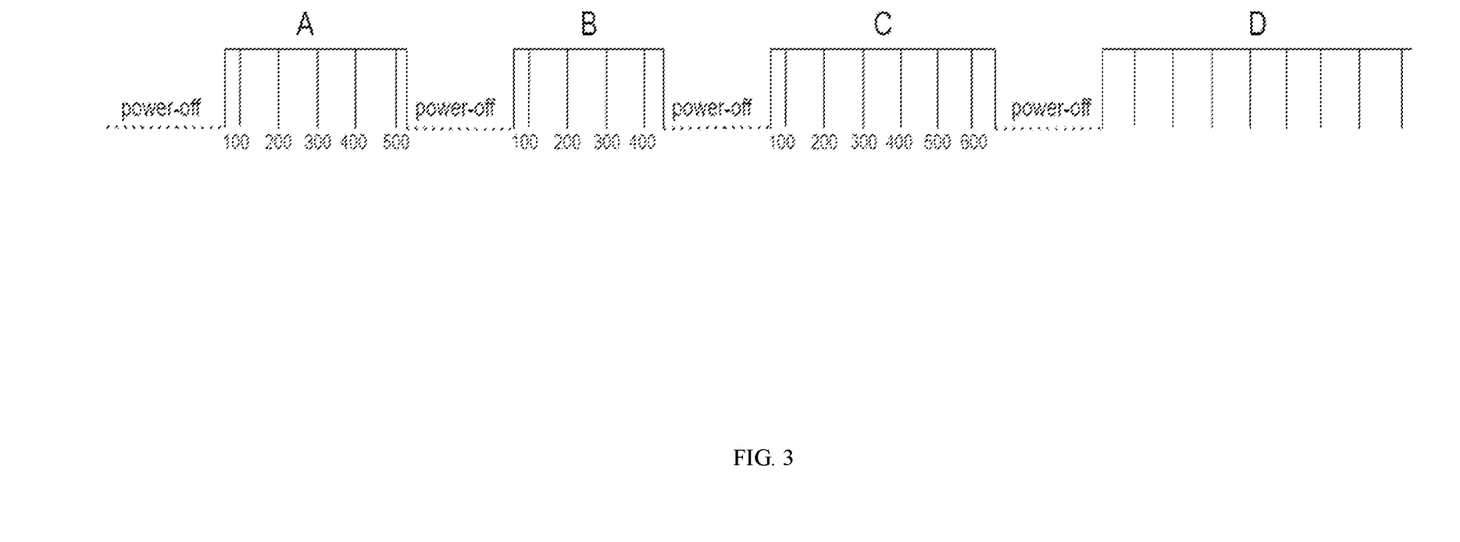
Figure 4:
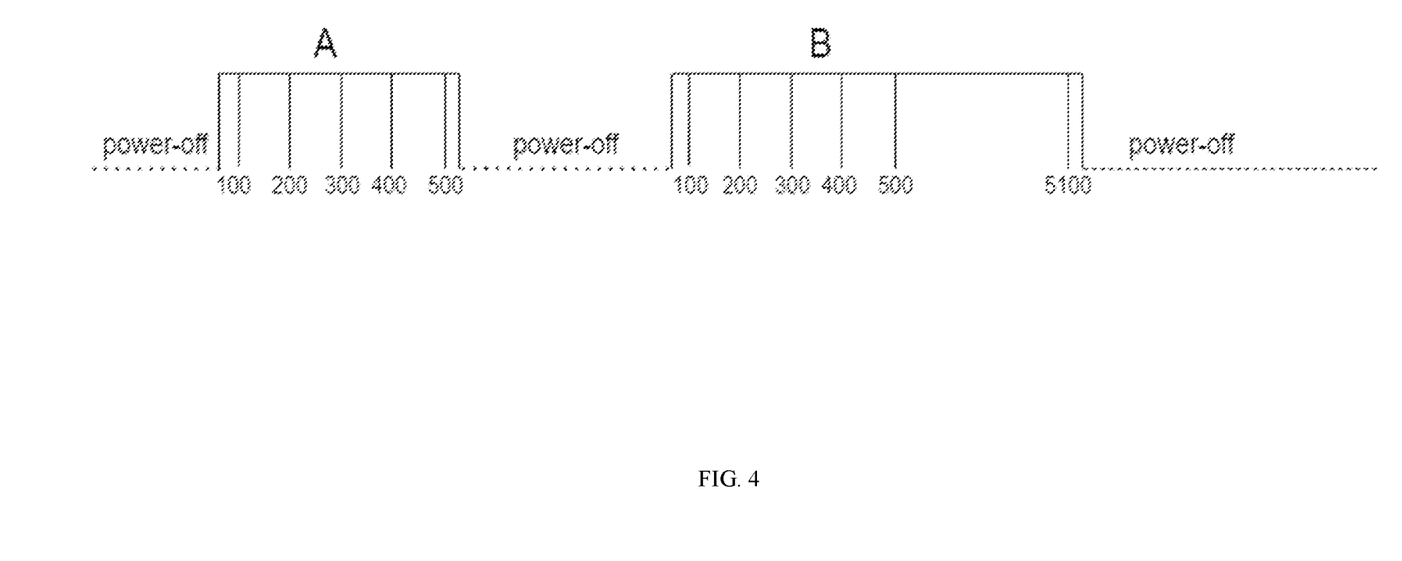

As shown in FIG. 1, FIG. 2A and FIG. 2B, in the embodiment of the present invention a method for controlling intelligent adjustment of brightness, color and color temperature of lamps comprises:

Step 1: powering on a smart device and starting a timer;

Step 2: self-checking whether there are three times of valid running time information of the device powered on in different periods in the storage module; if not, by identifying the timer value, storing once the running time of the device from the current power-on to the present in the storage module every 100 milliseconds, and judging whether the running time exceeds the predetermined range of 5 seconds; in the case of exceeding the limit, erasing all running time information of the device and waiting for the device to power off and power on again; if not exceeding the limit of 5 seconds, continuing to store once the running time information of the device in the storage module from this power-on to the present every 100 milliseconds until the device is powered off and on again. As shown in FIGS. 3, A, B, and C are three processes of storing the running time of the device powered on in different periods, i.e., storing once the current running time information of the device at an interval of 100 milliseconds during every power-on, wherein the final running time of the power-on device stored in period A is 500 milliseconds, stored in period B is 400 milliseconds and stored in period C is 600 milliseconds; since none of the final running time information in the power-on periods A, B, and C exceeds 5 seconds, in period D the final running time information of a lamp in the three different periods after power-on will be recognized and matched with the logic of dimming, color tuning or color temperature tuning; finally consistent with the dimming logic, the lamp enters the mode of automatically cycling PWM dimming until the device is powered off and locks the last PWM value stored before power-off as the selected final brightness. FIG. 4 illustrates information of invalid running time. Because the final running time of the powered-on device stored in period B reaches 5100 milliseconds, i.e., 5.1 seconds, exceeding 5 seconds, the running time information of the device powered on in two different periods A and B, i.e., 500 milliseconds and 5100 milliseconds, stored in the module will be erased.

Figure 5:
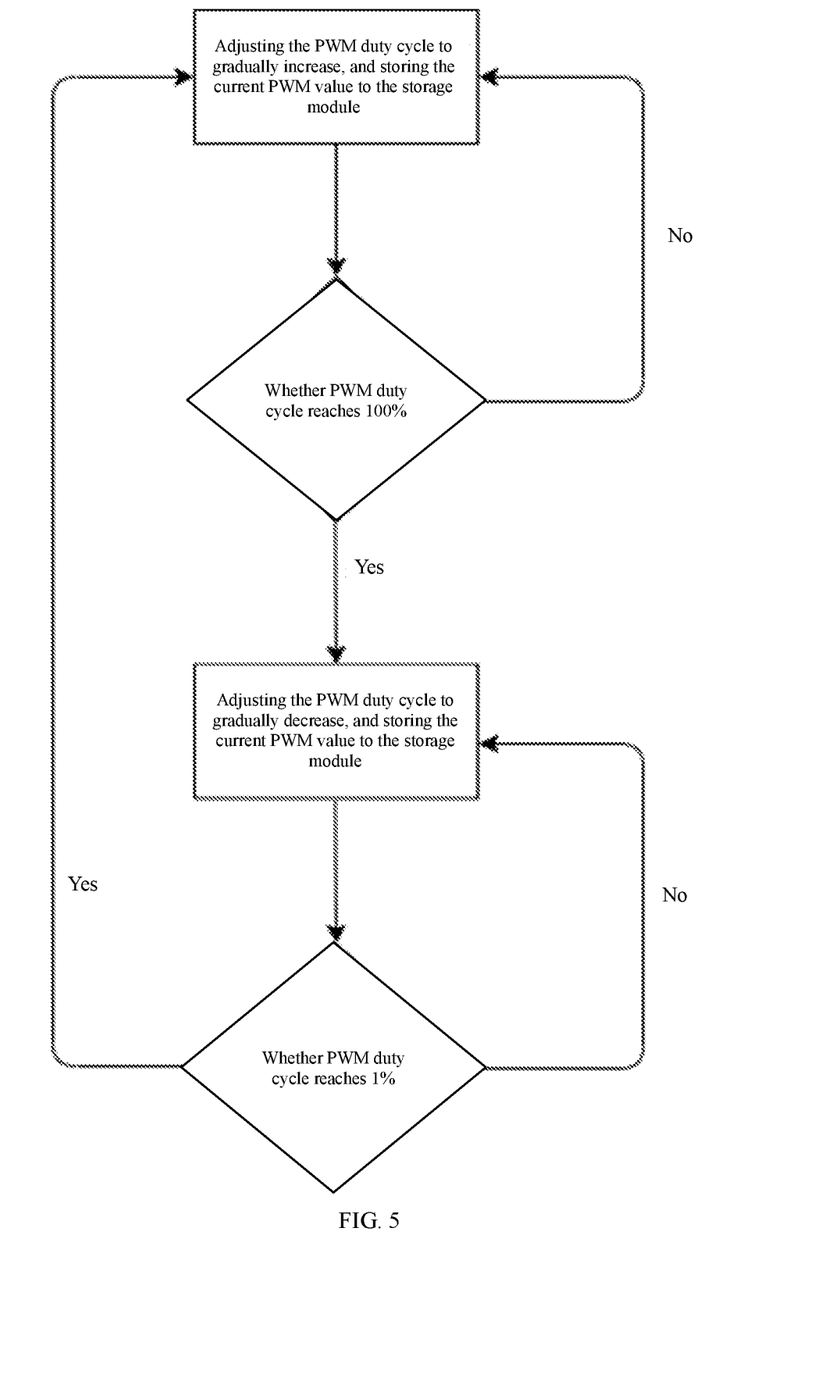
FIG. 5 is a flowchart showing PWM changes in an automatic cycle of brightness, color or color temperature tuning.
Figure 6:
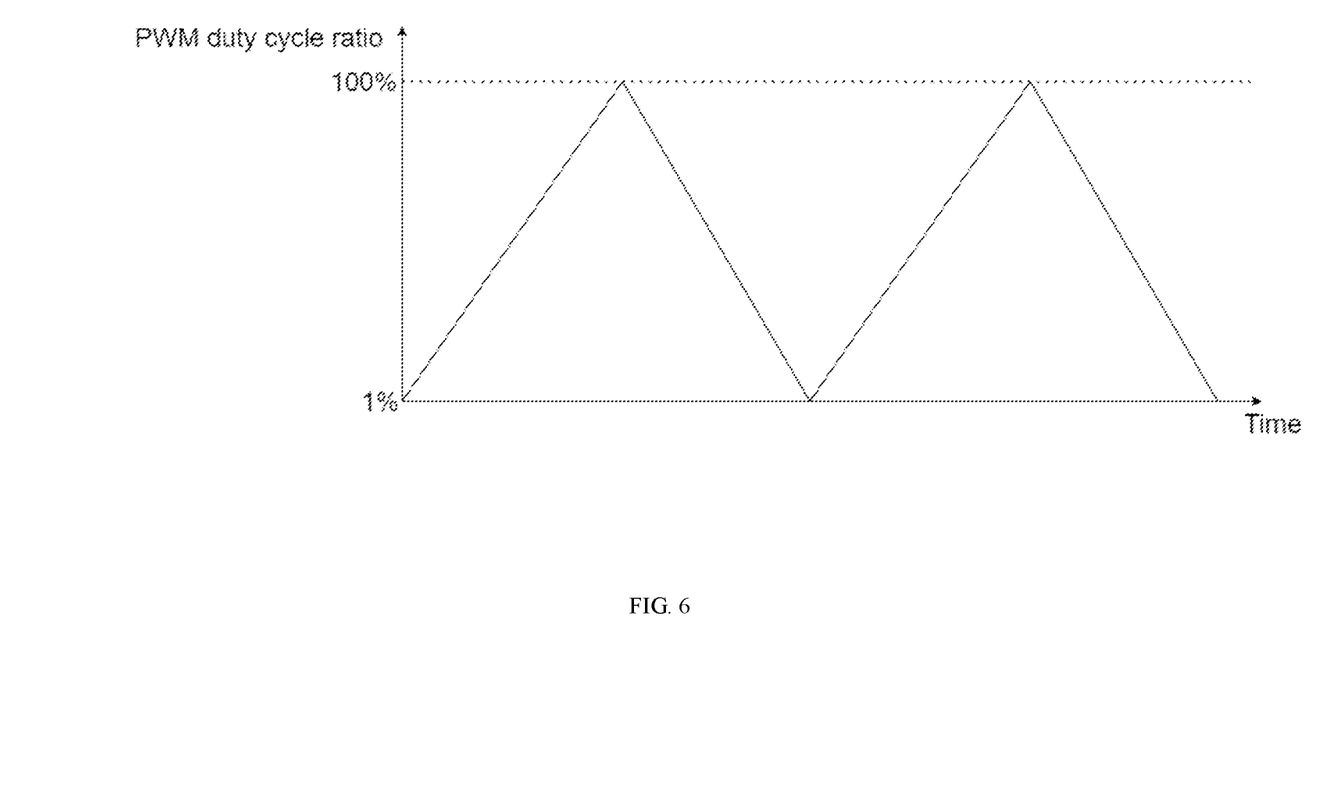
FIG. 6 is a graph showing variations of PWM duty cycle in an automatic cycle of brightness or color temperature tuning.

Step 3: self-checking whether the valid running time information of the device powered on in three different periods in the storage module matches the logic of dimming, color tuning or color temperature tuning; wherein the running time of the device powered on in three different periods in the dimming logic is in a range of 100 milliseconds to 1 second; as long as the time of the three periods is in this range, it is considered to be consistent with the dimming logic; at this time, erasing all the running time information of the power-on device, entering a mode of automatically cycling PWM dimming from 1% to 100% and from 100% to 1%, and simultaneously storing the changed PWM values to the storage module in real time until the device is powered off and then powered on to exit the mode of cycling dimming, and setting the PWM values as the last PWM values stored before the last power-off so that the dimming is completed. As shown in FIG. 3, after the valid running time information of the three periods A, B, and C are recognized in period D, it will be matched with the corresponding records to judge whether they are consistent with the logic of dimming, color tuning, and color temperature tuning. After successfully matching the dimming logic, as shown in FIG. 5 and FIG. 6, the PWM duty cycle will be automatically adjusted in a cycle of from low to high and then from high to low, and the PWM values will be stored in real time until power-off to select brightness.

Figure 7:
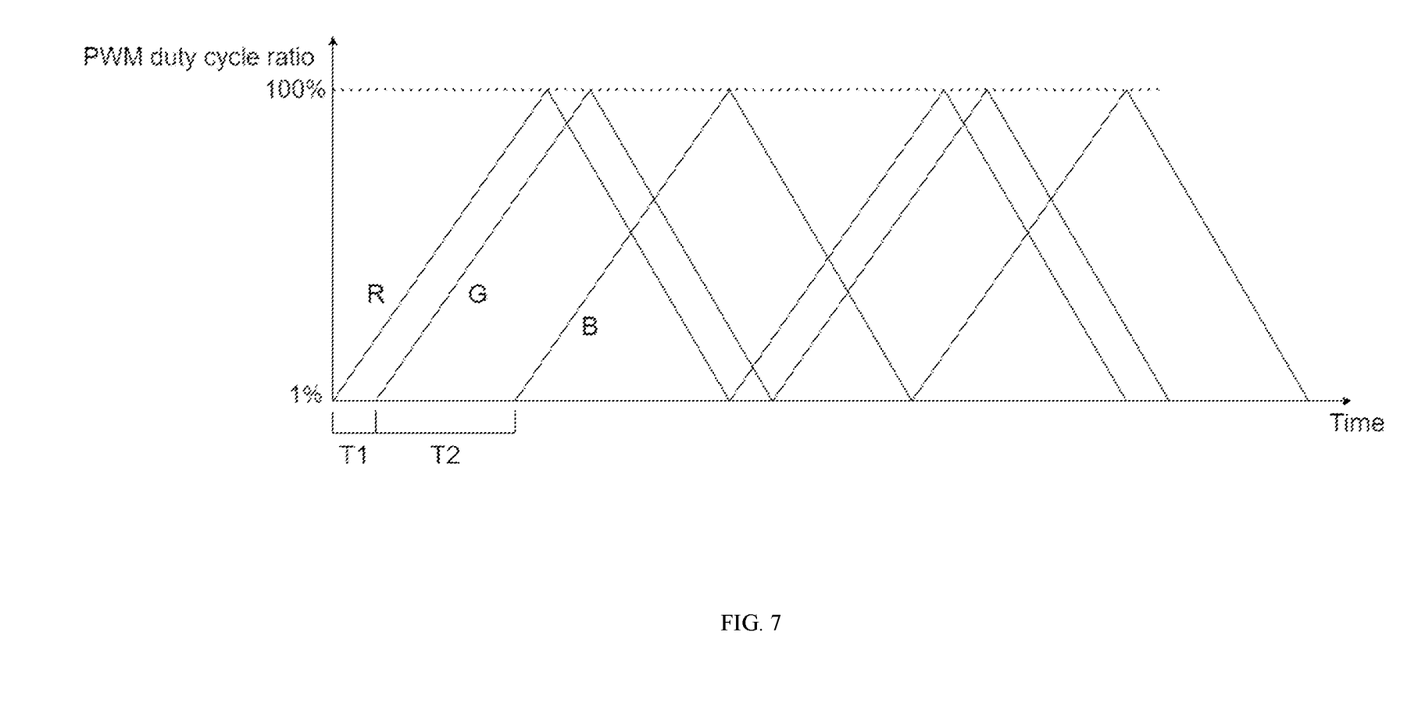
FIG. 7 is a graph illustrating variations of PWM duty cycle and time offset in RGB three channels in an automatic cycle of color tuning.

The running time of the device powered on in three different periods in the color tuning logic is in a range of 1 second to 3 seconds. As long as the valid running time information of the device powered on in three different periods is within this range, it is considered to be consistent with the dimming logic, and then all the running time information of the device would be erased. As shown in FIG. 5 and FIG. 7, PWM in each channel of RGB enters a mode of automatically cycling PWM color tuning from 1% to 100% and then from 100% to 1%, respectively; and there are RGB three channels of PWM. As shown in FIG. 7, according to the predetermined offset time T1 and T2, the G-channel PWM enters a state of automatically cycling color tuning later than the R-channel PWM by T1, and the B-channel PWM later than the R-channel PWM by T2. At the same time, the changed PWM values are stored in the storage module in real time until the device is powered off and on again to exit the mode of cycling color tuning, and the PWM value is set as the last PWM value before the last power-off. Now the color tuning is completed.

The running time of the device powered on in three different periods in the color temperature tunning logic is in a range of 3 seconds to 5 seconds. As long as the valid running time information of the device powered on in three different periods is within this range, it is considered to be consistent with the color temperature tunning logic, and then all the running time information of the device would be erased. As shown in FIG. 5 and FIG. 6, the lamp enters a mode of automatically cycling PWM color temperature tuning from 1% to 100% and from 100% to 1%; at the same time, the changed PWM values are stored in the storage module in real time until the device is powered off and on again to exit the mode of cycling color temperature tuning, and the PWM values are set as the last PWM values before the last power-off. Now the color temperature tuning is completed.

The method of intelligent adjustment of brightness, color, and color temperature of the present invention has high error tolerance, supports parallel recognition logic matching multiple behaviors, has low cost, flexible detection and diverse functions, and can meet the requirements for more automatically and delicately tuning brightness, color and color temperature, offering uses convenience and better experience.

Finally, it should be noted that the above embodiments are merely used to illustrate the technical solutions of the present invention, and shall not be construed as limitation thereto. Although the present invention has been described in detail with reference to the foregoing embodiments, a person of ordinary skill in the art should understand that he may still amend the technical solutions described in the foregoing embodiments or perform equivalent replacements for some or all of the technical features thereof. These amendments or replacements do not deviate the essence of the corresponding technical solutions from the scope of the technical solution of each embodiment of the present invention.

What is claimed is:

1. A method for controlling intelligent adjustment of brightness, color and color temperature of lamps, comprising:

acquiring information on device running duration of a current device powered on in different time; determining a target operating mode of the device based on the information on running duration of the device powered on in different time, wherein when the information on running duration of the device powered on in different time shows the same predetermined number as a dimming logic and consistent predetermined time range with the dimming logic, the target operating mode is a predetermined dimming mode; when the information on running duration of the device powered on in different time shows the same predetermined number as a color tuning logic and consistent predetermined time range with the color tuning logic, the target operating mode is a predetermined color tuning mode; and when the information on running duration of the device powered on in different time shows the same predetermined number as a color temperature tuning logic and consistent predetermined time range with the color temperature tuning logic, the target operating mode is a predetermined color temperature tuning mode; and controlling the operation of the device according to the target operating mode.

2. The method for controlling intelligent adjustment of brightness, color and color temperature of lamps according to claim 1, wherein the predetermined dimming mode is a PWM dimming mode in which the device is PWM dimmed in a cycle of from low brightness to high brightness and then from high brightness to low brightness.

3. The method for controlling intelligent adjustment of brightness, color and color temperature of lamps according to claim 1, wherein the predetermined color tuning mode is a three-channel PWM color tuning mode in which a RGB three-channel PWM duty cycle is cycled from low to high, and then from high to low.

4. The method for controlling intelligent adjustment of brightness, color and color temperature of lamps according to claim 1, wherein the color temperature tuning mode is a mode, in which the color temperature of the device is PWM adjusted in a cycle of from low color temperature to high color temperature and then from high color temperature to low color temperature.

5. The method for controlling intelligent adjustment of brightness, color and color temperature of lamps according to claim 2, further comprising: storing PWM values in real time until the device exits the target operating mode before power off when the device is powered off and then powered on, and locking the PWM values as last PWM values stored by the device before the last power-off.

6. The method for controlling intelligent adjustment of brightness, color and color temperature of lamps according to claim 1, further comprising: periodically storing once the current booting running duration of the device at a predetermined time interval, wherein finally, the current power-on running duration of the device is equal to that stored last time of current power-on.

* * * * *